United States Patent

[11] 3,608,659

[72] Inventor Norman S. Gardner
 64 Trenor Drive, New Rochelle, N.Y. 10804
[21] Appl. No. 813,922
[22] Filed Apr. 7, 1969
[45] Patented Sept. 28, 1971

[54] MOTORIZED GOLF CART
 10 Claims, 5 Drawing Figs.
[52] U.S. Cl. ................................................ 180/19 H,
 180/65, 280/1.5, 280/DIG. 5
[51] Int. Cl. .................................................... B62d 51/04
[50] Field of Search ..................................... 180/19, 65;
 280/1.5

[56] References Cited
 UNITED STATES PATENTS
2,706,008 4/1955 Voigt ........................... 180/19 (S)
2,869,661 1/1959 Fernandez .................... 180/19
2,879,858 3/1959 Thomas ........................ 180/19 (H)
2,962,106 11/1960 Burnside et al. ............. 180/19 (H)
3,328,043 6/1967 Johnson ........................ 280/1.5
3,150,736 9/1964 Kaufman ...................... 280/DIG. 5

Primary Examiner—Benjamin Hersh
Assistant Examiner—Milton L. Smith
Attorney—Brientenfeld & Levine ABSTRACT: Wheeled cart carries one-way electric motor, battery for energizing motor, and one-way transmission for driving wheels. Transmission includes belt loosely trained about pulleys, and a roller engageable with belt to make it taut so that it transmits motion from motor to wheels; disengagement of roller from belt allows cart to be rolled backwardly. Handle includes two telescoping parts, inner part being connected to a rheostat which controls amount of current supplied to motor. Pulling force on outer end of handle determines setting of rheostat and speed of motor.

PATENTED SEP28 1971

INVENTOR:
NORMAN S. GARDNER
BY
Breitenfeld & Levine
ATTORNEYS

MOTORIZED GOLF CART

This invention relates to relatively small, battery-operated, motorized golf carts of the type intended to carry a bag of golf clubs, but not the player.

Golf carts of this type are usually provided with a handle by means of which the player guides the cart, the handle sometimes being furnished with a switch for turning the motor on and off, to move the cart and stop it, respectively.

It is an object of the present invention to provide a motorized golf cart whose speed automatically adjusts itself to the walking pace of the player using it, and to the terrain over which it moves.

It is another object of the invention to provide such a cart which moves forwardly when the motor is energized, but which cannot roll backwardly unless the clutch forming part of the transmission is disengaged.

Additional objects and features of the invention will be apparent from the following description in which reference is made to the accompanying drawings.

Figure 1:
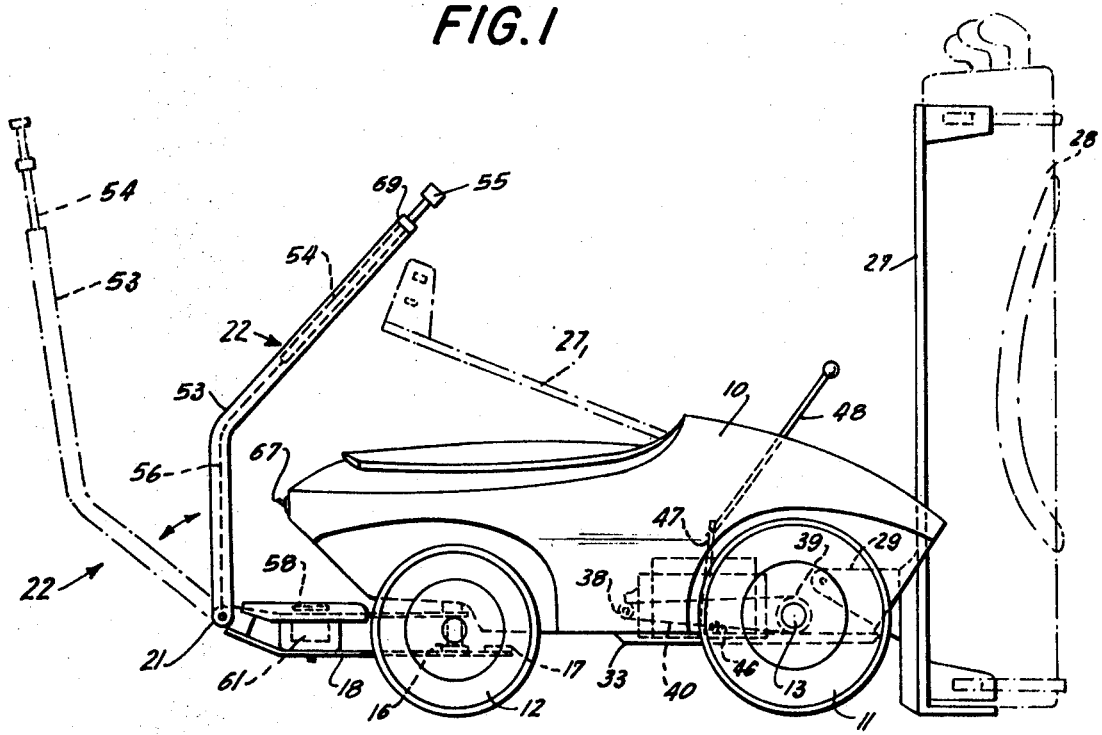
FIG. 1 is a side elevational view of an illustrative golf cart according to this invention.
Figure 2:
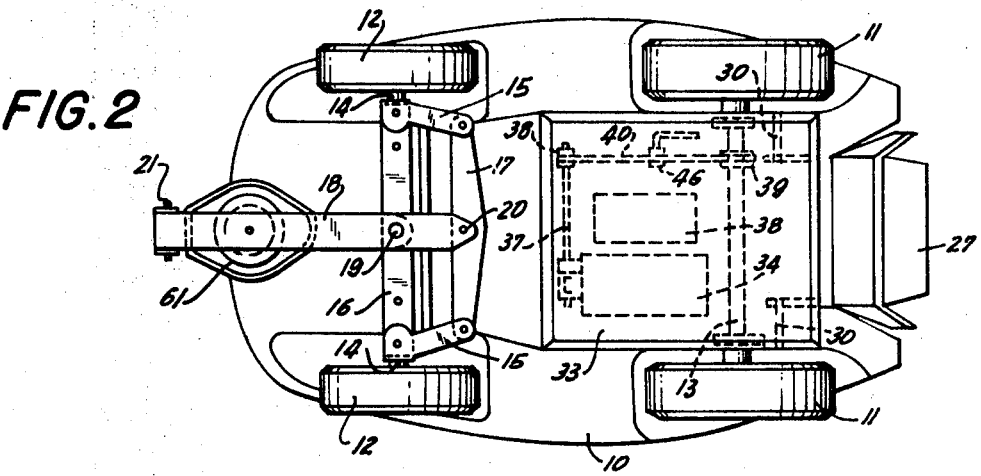
FIG. 2 is a bottom view of the cart.

The cart chosen to illustrate this invention includes a body 10, which may be fabricated of a suitable molded plastic, supported by a pair of rear wheels 11 and a pair of front wheels 12. The rear wheels 11 are preferably of larger diameter, to enhance their traction force on the turf, while the front wheels 12 are of smaller diameter for ease of steering. A rear axle 13 extends transversely through the cart body 10, and is journaled in the sides of the body, the rear wheels 11 being fixed to the ends of the axle 13 exposed on the exterior of the body.

Each front wheel 12 is rotatably supported on a stub axle 14 fixed to one end of a link 15. Each link is pivotally connected between the end of a crossbar 17 and the end of a support bar 16, the latter being fixed to the cart body 10. A steering link 18 is pivoted to the support bar 16 at 19, and is pivoted at its back end to the crossbar 17 at 20. Hinged to the forward end of the steering link 18, by pin 21, is a handle 22. It will be appreciated that if the handle 22 is moved horizontally in either direction, the steering link 18 pivots about point 19 causing the crossbar 17 to shift. As a result, the links 15 and hence the stub axles 14 pivot about the ends of the support bar 16 and the direction of movement of the cart changes.

At its rear, the body 10 pivotally supports a rack 27 adapted to hold a bag 28 of golf clubs. The rack 27 is carried by a pair of arms 29 pivotally mounted on pins 30 within the body 10, the arms projecting through elongated slots (not shown) in the body. In this way, the rack may be swung between an inclined travel position (dot-dash lines), in which it rests within a depression in the cart body, and an upright position (full lines) in which its bottom rests on the ground. Golf clubs may conveniently be removed from, and returned to, the bag 28 when in the upright position, and since the rack 27 rests on the ground while in this position there is no tendency for the weight of the bag and clubs to tip the cart about its rear wheels.

The bottom wall of the cart body is furnished with a rectangular hole covered by a support plate 33, preferably of metal, fastened to the body 10 by suitable means not shown. The plate 33 carries the drive mechanism for the cart. The drive mechanism (best seen in FIG. 3) includes, in the present example, a one-way, 12 volt DC, electric motor 34 powered by a 12 volt battery 35. A transmission delivers rotary motion from the motor shaft to the rear wheels 11. The transmission includes, within the housing 36, a worm fixed to and rotated by the shaft of motor 34, and a worm wheel engaging the worm, the worm wheel being fixed to a transverse shaft 37. At its free end, the shaft 37 carries a pulley 38, and another pulley 39 is fixed to the rear axle 13 of the cart. A belt 40 is loosely trained about the pulleys 38 and 39, the fit being so loose that normally, i.e., unless the belt is made taut, the belt slips when either pulley is rotated so that no motion is transmitted to the other pulley.

A clutch arrangement is provided for the purpose of making the belt 40 taut, when desired, to effect a driving relationship between the motor 34 and the axle 13. The clutch of this example includes a support rod 43, the central portion of which is pivotally mounted in a bracket 44 fixed to the plate 33. Near its inner end, the rod 43 is provided with two right-angle bends defining a connecting portion 42, and an inner end portion 45 parallel to, but offset from, the pivot axis of the rod. The end portion 45 carries a push member, which may be a polyethylene roller 46, located in the plane containing the belt 40. Closer to its opposite end, the rod 43 is provided with another right angle bend defining an arm 47 to which the lower end of a push rod 48 is pivotally connected. The push rod 48 extends through a hole 49 in the cart body 10, exposing a handle portion 50 at its upper end.

Figure 3:
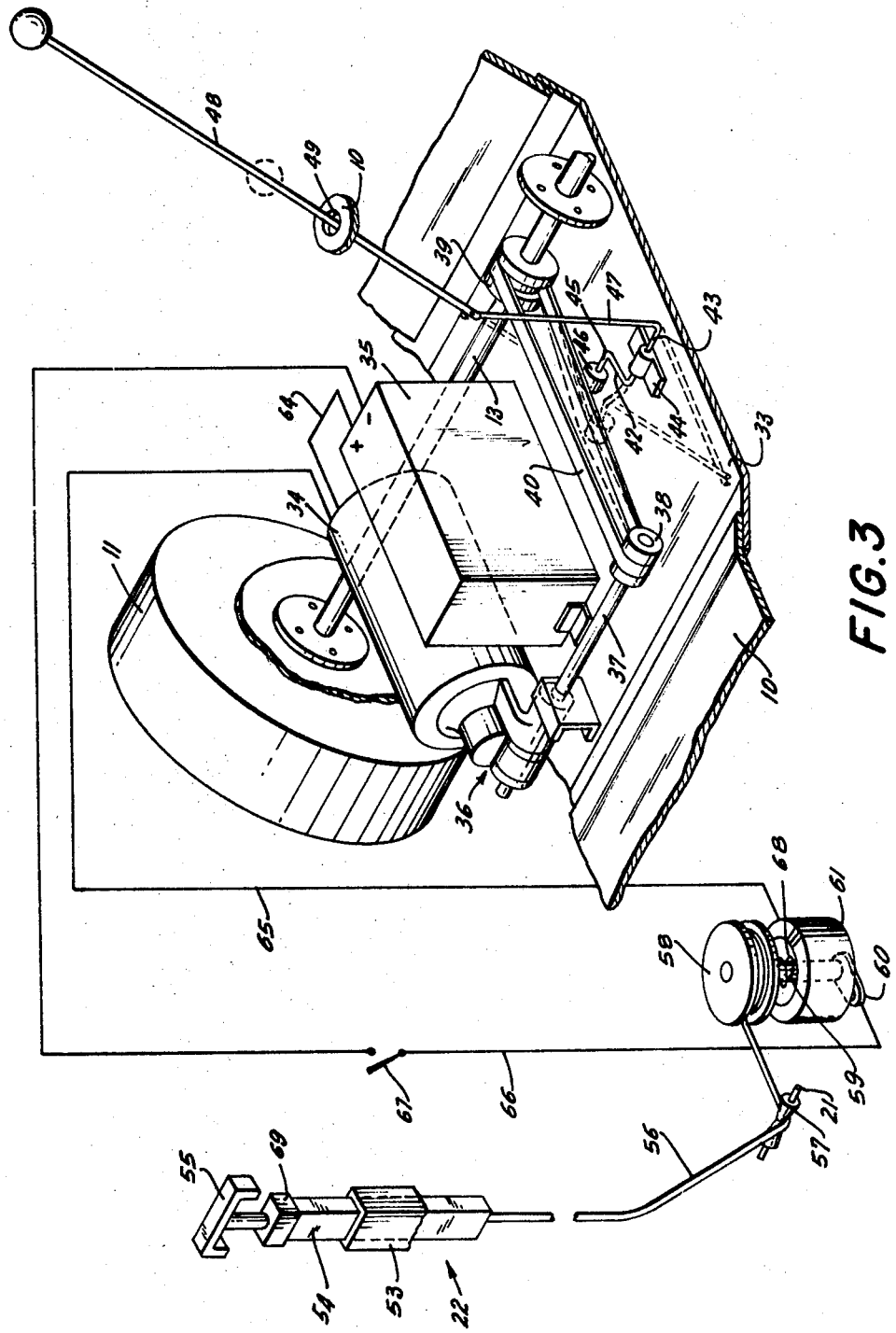
FIG. 3 is a fragmentary perspective view, on an enlarged scale, of the drive mechanism for the cart.

When the parts are positioned as shown in full lines in FIG. 3, the clutch is disengaged and the roller 46 is at rest out of engagement with the belt 40. In this condition, the push rod 48 is in its uppermost position, the connecting portion 42 is horizontal, and the arm 47 is almost vertical. When viewed from the side of the cart, as in FIG. 1, the arm 47 is arranged at an angle of less than 90° with respect to the connecting portion 42. To engage the clutch, the handle 50 is pushed downwardly until the parts reach the broken line position of FIG. 3. The arm 47 has moved through an angle greater than 90° and is now horizontal, lying on the plate 33. Coordinately, the connecting portion 42 swings the roller 46 through an arc causing the latter to engage the lower run of belt 40 and push it upwardly, thereby tensioning the belt. Since the connecting portion 42 has also swung through more than 90° the downward force of the belt 40 on the roller 46 tends to rotate the rod portion 42 in a counterclockwise direction in FIG. 1, but such movement is resisted by the engagement of arm 47 against plate 33. Thus, the belt 40 is held taut until the handle 50 is pulled upwardly to return the parts to their full-line positions.

With the clutch engaged, rotation of the shaft 37, caused by energization of the motor 34 is transmitted to the axle 13 and wheels 11 via the belt 40 and pulleys 38 and 39, and hence the cart moves forwardly. It will be appreciated that should the cart be stopped on an incline, while the clutch is engaged, it cannot roll away. The reason is that any tendency of the axle 13 to rotate is resisted by the shaft 37, since the worm wheel on the shaft cannot rotate the worm on the motor shaft. Thus, the worm and worm wheel within housing 36 serve as a brake. However, should the player want to maneuver the cart rearwardly, he simply pulls the handle 50 up, to disengage the clutch, whereby the rear axle can turn freely since the pulley 39 will slip with respect to the loose belt 40.

The cart handle 22 comprises two telescoping parts. The outer part 53, hinged by pin 21 to the steering link 18, is hollow. The inner part 54, slidably arranged within the outer part, presents a hand grip 55 at its outer end, and has one end of a cord 56 connected to its inner end. The cord extends through the outer part 53, partially around a roller 57, carried by pin 21, and is wrapped around a spool 58, the end of the cord being fixed to the spool. The spool 58 is fixed to the upper end of a shaft 59 which at its lower end carries the wiper 60 of a circular rheostat 61. The rheostat may be a ring rheostat sold by Ward Leonard under the trademark "vitrohm." A circuit for energizing the motor 34 includes the battery 35, one pole of which is connected to the motor by conductor 64, a conductor 65 connecting the motor to the resistance of rheostat 61, and a conductor 66 connecting the rheostat wiper 60 to the other pole of the battery 35 via a main switch 67.

A spring 68 surrounding the shaft 59 continuously urges the shaft, spool, and wiper in a clockwise direction, as viewed in FIG. 3, thus tending to wind the cord 56 around the spool.

Consequently, when no pulling force is applied to the grip 55, the spring 68 maintains the inner handle part 54 in its innermost position, wherein a collar 69 formed on the inner part rests against the free end edge of outer part 53, as shown in full lines in FIG. 1. In addition, the wiper 60 is positioned so that the maximum resistance of the rheostat 61 is in the circuit. In fact the wiper may be spaced from the rheostat resistance so that the circuit is open. In any case, with no force applied to the grip 55, the motor 34 is not energized even though the main switch 67 is closed.

When a pulling force is applied to the grip 55, the inner handle part 54 slides out of the outer part 53, against the force of spring 68, an amount dependent upon the magnitude of the pulling force. This movement of the inner part 54 causes rotation of spool 58, via cord 56, and moves the wiper 60 with respect to the rheostat resistance. The arrangement of the rheostat is such that when the wiper first engages the resistance, the maximum resistance of the rheostat is in the motor-energizing circuit. As the wiper moves, in response to outward movement of the cord 56, less and less resistance is in the circuit.

Thus, it will be seen that if the player, grasping the grip 55, starts walking from a standstill, or begins walking up a hill or begins walking faster, so that the inner handle part 54 is pulled farther out of the outer handle part 53, there will be less resistance in the circuit whereby more voltage is supplied to the motor 34 and the motor and cart move faster. Conversely, should the player begin walking downhill, or slow down, or stop, the spring 68 pulls the inner handle part 54 into the outer part 53, more resistance is added to the circuit, and the motor 34 and cart slow down. In other words, the speed of the motor and cart is directly proportional to the pulling force on the grip 55, so that the cart automatically maintains a speed conforming to that of the player pulling the handle. It may be mentioned that the pulling force applied by the player is very small, since it need only be enough to overcome the force of spring 68, and the spring force is made just sufficient to overcome the frictional forces tending to prevent the inner handle part 54 and the shaft 59 and wiper 60 from returning to their inoperative positions when the force on the grip 55 is released.

Figures 4, 5:
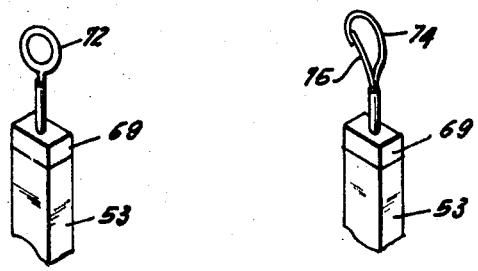
FIG. 4 is a fragmentary perspective view showing an alternative type of cart handle.
FIG. 5 is a view similar to FIG. 4 showing another type of cart handle.

If desired, the grip 55 may be replaced by a bracket 72 (FIG. 4) which a player may slip over his wrist. Alternatively, the grip may be replaced by a clip, including a hook portion 74 and a spring member 75, which a player may engage with a portion of his clothing, such as his belt. In either case, both hands of the player are left free.

The invention has been shown and described in preferred form only, and by way of example, and it is understood, therefore, that many variations may be made in the invention which will still be comprised within its spirit.

What is claimed is:
1. A motorized golf cart, comprising
a. a body;
b. a rack pivotally secured to said body for accommodating a bag of golf clubs, said rack being pivotable between an inclined position in which it rests on said body, and an upright position in which said rack is vertical and its bottom rests on the ground,
c. wheels for movably supporting said body on the ground;
d. a one-way electric motor mounted in said body;
e. a one-way transmission, including a clutch, between said motor and at least one of said wheels for propelling the car forwardly when said motor is energized, said transmission preventing the cart from rolling backwards when the clutch is engaged and the motor deenergized;
f. means exposed on the exterior of said body for operating said clutch, whereby the transmission connection between said wheel and motor may be selectively disconnected to permit the cart to be manually maneuvered rearwardly;
g. an energizing circuit for said motor including a battery carried by said body, and a rheostat in series with said battery and motor;
h. a spring urging the parts of said rheostat toward a normal position in which the maximum resistance thereof is in said circuit;
i. a handle secured to said body; and
j. means responsive to a pulling force applied to said handle for adjusting said rheostat parts against the force of said spring, said rheostat adjustment being such that the amount of rheostat resistance in said circuit is inversely proportional to the pulling force, whereby the greater the pulling force the smaller the resistance in said circuit and the greater the speed of said motor and hence the greater the speed of the cart,
said spring returning said rheostat parts to their normal position when said handle is released.

2. A motorized golf cart as defined in claim 1 wherein said transmission includes a worm driven by said motor and a worm wheel engaging said worm so as to be driven by it.

3. A motorized golf cart as defined in claim 1 wherein said transmission includes a pair of spaced apart pulleys, one of said pulleys being driven by said motor and the other serving to drive said wheel, and a belt loosely trained about said pulleys, whereby when said clutch is disengaged said belt slides with respect to said pulleys, and wherein said clutch includes a push member movable between a rest position, in which it is disengaged from said belt, and an active position in which it engages said belt to make the latter taut so that it does not slide with respect to said pulleys, whereby said belt transmits motion between the pulleys.

4. A motorized golf cart as defined in claim 3 wherein said push member is a roller.

5. A motorized golf cart as defined in claim 3 wherein said clutch includes a support means mounted for pivotal movement about an axis, said support means carrying said push member at a location spaced from said axis, and means responsive to movement of said exposed means (f) for causing pivotal movement of said support means so as to shift said push member through an arcuate path between its rest and active positions.

6. A motorized golf cart as defined in claim 1 wherein said handle includes two parts mutually slidable in the longitudinal direction of the handle, one of said handle parts being fastened to said body, and the other of said handle parts carrying a means to be pulled at its free end, said other handle part being connected to said means (j), whereby application of a pulling force to said means to be pulled causes relative movement between said handle parts and adjustment of said rheostat parts.

7. A motorized golf cart as defined in claim 6 wherein said handle parts are telescopically arranged, said other handle part being slidable within said one handle part.

8. A motorized golf cart as defined in claim 6 wherein the wiper of said rheostat is mounted on a rotatably shaft, and said means (j) includes a spool carried by said shaft, and a cord wrapped around said spool, said cord being connected to said other handle part, whereby movement of said other handle part is transmitted to said spool via said cord causing rotation of said spool and shaft and hence movement of said rheostat wiper.

9. A motorized golf cart as defined in claim 6 wherein said means to be pulled is a loop means for encircling the wrist of the user of the cart.

10. A motorized golf cart as defined in claim 6 wherein said means to be pulled is a clip means for connection to a portion of a garment worn by the user of the cart.